Figure 1:
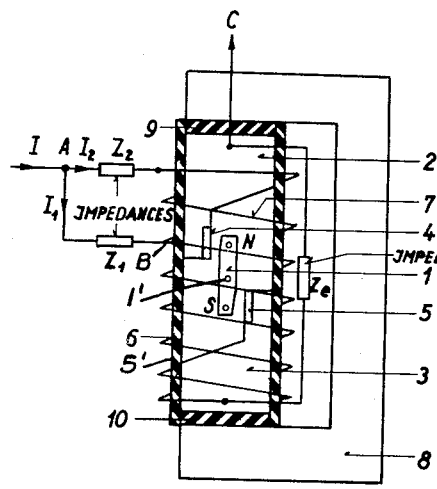

March 7, 1950 F. KESSELRING 2,499,394
ELECTRIC CONTACT APPARATUS
Filed Oct. 7, 1947

INVENTOR
FRITZ KESSELRING
BY
ATTORNEY

Patented Mar. 7, 1950

2,499,394

UNITED STATES PATENT OFFICE 2,499,394

ELECTRIC CONTACT APPARATUS

Fritz Kesselring, Zollikon-Zurich, Switzerland, assignor to F K G Fritz Kesselring Gerätebau Aktiengesellschaft, Bachtobel - Weinfelden, Switzerland, a Swiss company Application October 7, 1947, Serial No. 778,439
In Switzerland July 12, 1946

20 Claims. (Cl. 175—373)

My invention relates to electric contact apparatus, such as circuit opening or closing contactors, commutating, rectifying or converting devices and the like equipment, operating with or controlled by variable, particularly alternating, current.

It is desirable to have these apparatus perform their switching action (i. e. switch their movable contact member from one to the other position) within such intervals of the current cycle period and at such instantaneous current values that the stresses imposed on the apparatus are a minimum. Various designs and control schemes have been proposed to approach such a performance, but the means heretofore available are imperfect especially when extremely short switching intervals and highly accurate timing are desired. Therefore, one of the broader objects of my invention is to devise contact apparatus which are capable of performing a switching action within extremely short intervals, for instance in the order of one millisecond or less, and with maximum accuracy of timing relative to the current cycle period, while having an especially simply designed and reliably operating structure.

It has been assumed, generally, that the magnetic flux which controls the movement of the switching element in electromagnetic contactors, relays and the like apparatus is in phase with the controlling variable or alternating current. Recent investigations disprove this assumption. It was found that in magnet systems of customary design and structure, operating with alternating current of customary frequency, for instance, 50 or 60 C. P. S. the magnetizing current leads the magnetic flux by a noticeable phase angle of some degrees which, expressed in terms of time, may reach the value of some $10^{-4}$ seconds. This phase difference is negligible in comparison with the minimum switching periods, in the order of milliseconds, heretofore customary. However, if one attempts to design apparatus for operation within intervals of fractions of a millisecond, this phase lag of the magnetic flux is in the same order of magnitude as the switching interval and hence can no longer be disregarded. That is, there are numerous cases of application where the phase lag may cause disturbance of the desired switching operation. It is, therefore, also an object of my invention to considerably reduce or compensate the just-mentioned detrimental effects of current-lagging flux so as to secure accurate and reliable switching performance not only for switching intervals in the order of one millisecond but even down to switching intervals in the order of ten-thousandths of a second or less.

In addition to the above-mentioned lagging tendency of the magnetic flux relative to the current that causes it, there are other phenomena responsible for the shortcomings of conventional electromagnetic contact apparatus. For instance, due to the occurrence of saturation effects, the time characteristic of the magnetic flux may differ from that of the current not only in phase but also in configuration. Generally, the time curve of flux caused by sinusoidal current tends to distort toward trapezoidal shape. As a result, the flux has an increased rate of change (steepness) at the points of zero passage. This is another cause of the difficulties encountered with known apparatus especially at extremely short switching intervals; and it is also an object of my invention to eliminate distrubances due to such causes.

For optimum switching performance of electromagnetic contactors, especially of the synchronous type, it is often desired that a contact closing movement be initiated shortly before the current reaches its zero passage or that a contact opening movement be performed only in the descending wave portion of the current to be interrupted. This particular timing is difficult to secure in the known apparatus, even if current and magnetic flux are synchronous, and usually requires an appreciable amount of accessory equipment. It is, therefore, another object of my invention to devise electromagnetic contactors that reliably secure an accurately timed performance by virtue of inherent properties and by means of a relatively simple design so that the just-mentioned difficulties are eliminated with the result, for instance, that synchronous type switches and current commutating or converting contact devices can be simplified over the designs heretofore required for comparable performance.

In accordance with my invention, I design electromagnetic contact apparatus in such a manner that the magnetic force which controls the contact movement exerts its effect earlier, relative to the cycle period of the current that controls the force, than in conventional apparatus. To this end, according to one feature of my invention, I provide the contactor coil circuits with phase-shifting elements for biasing the magnetic flux in the phase-advancing sense so as to virtually eliminate or compensate the above-mentioned phase lag. According to another feature of the invention, I design the contactor structure, aside from the coil circuits, so that its inherent magnetic or mechanic properties secure an earlier occurrence of contact controlling force or flux. According to a third feature of my invention, I combine the first-mentioned flux advancing coil circuit means with the last-mentioned design of the contactor structure.

According to another feature of my invention, more specific than the above-mentioned phase-biasing coil circuits, I design the apparatus in such a manner that the movable contact member is operated by a resultant force which is phase leading relative to the current to be switched and produced by at least two variable control currents, both dependent upon the current to be switched, in cooperation with an additional magnetic field. If the additional magnetic field is independent of that current, the operation of the apparatus shows some relationship to that of the so-called moving-coil or moving-iron instruments. If, according to another possibility, the additional magnetic field is produced or controlled by the current to be switched, the apparatus may show some resemblance to that of dynamometric instruments. However, according to another possibility within the invention, the resultant force effective on the movable switch member may be produced only by variable currents dependent upon the current to be switched.

Figure 2:
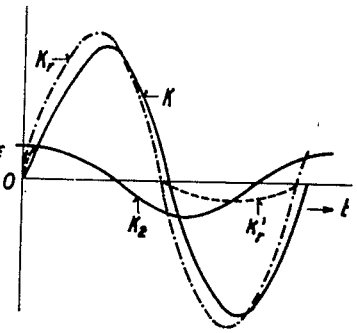
Figure 3:
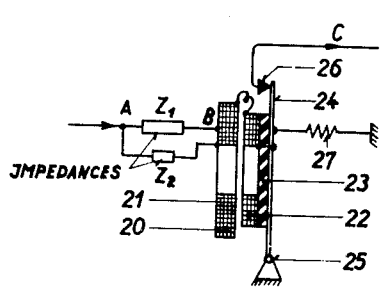
Figure 4:
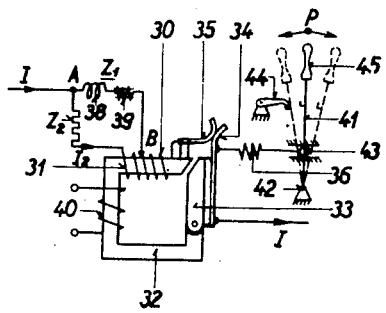

These and other objects and features of the invention will be apparent from the following description of the embodiments exemplified by the drawing in which Figure 1 shows an electromagnetic contact apparatus according to the invention partly in cross section, Fig. 2 is an explanatory diagram of force-time curves relating to the embodiment of Fig. 1, Fig. 3 is a sectional view of an electrodynamic contact apparatus, and Fig. 4 shows another electromagnetic apparatus.

The contact apparatus according to Fig. 1 has an armature or switching element 1 consisting of a permanent magnet with a north pole N and a south pole S. The switching element 1 is revolvably mounted between two pole pieces 2 and 3 of ferromagnetic material. These pole pieces serve also as contacts and are provided with contact plates 4 and 5 for engagement by the switching element 1. The pole pieces 2, 3 and the switching element 1 are enclosed in an insulating cartridge-type housing or tube 5'. The pivot pin 1' of switching element 1 is mounted on the tube 5'. A main current coil, providing most of the required ampere turns, is denoted by 6 and an additional control coil by 7. The lower end of coil 7 terminates at point B. Coil 6 has one end at point B while the other end is connected to pole piece 3. Current is supplied between points A and C. These coils serve to induce magnetic flux through the pole pieces 2 and 3 for controlling the contact movement of the element 1. The magnetic circuit is closed through a yoke N which is electrically insulated from the pole pieces 2 and 3 by inserts 9 and 10, respectively. The circuit for energizing the magnetizing coils 6 and 7 include impedances $Z_1$ and $Z_2$, while $Z_e$ represents an impedance connected across the contact gaps.

The contactor operates as follows: When the contacts are closed, the total current I divides itself at the point A into component currents $I_1$ and $I_2$. The first component current $I_1$ flows through impedance $Z_1$ to point B. The second component current $I_2$ flows through impedance $Z_2$ and coil 7 to point B. Thence the total current I flows through coil 6 to pole piece 3 and through the switching element 1 and the pole piece 2 to the terminal point C. The variable magnetic flux produced in the magnetic circuit by the current I in coil 6 cooperates with the constant field of the permanent magnet 1 to impose a component force on the switching element, this force is represented in Fig. 2 by the curve K. If it is assumed, for the purpose of explanation, that the magnetic flux produced by the current I in coil 6 is exactly in phase with this current, the curve K in Fig. 2 may also be considered to represent the current I. The component current $I_2$ in coil 7 produces a variable component magnetic field which cooperates with that of the permanent magnet 1 to impose on the switching element a force represented in Fig. 2 by the curve $K_2$. The component forces K and $K_2$ result in the force $K_r$ which passes through the zero points earlier than the component force K and hence earlier than the current I.

If one assumes that at the moment $t=0$ the apparatus according to Fig. 1 is placed under voltage, all currents above referred to are still zero at this moment. It is desired that the phase-advancing effect occurs within an interval which is short relative to the half-wave period of the current to be controlled. Such a desired build-up of time-force $K_2$ from zero to the normal value is shown in Fig. 2 by a dotted line.

The apparatus according to Fig. 1 may be used advantageously for polarized or valve-type operation, due to the fact that the moving force imposed on the switching element 1 is proportional to the current and hence changes its direction together with the change in current polarity. As long as the current I is substantially positive, the switching element 1 is attracted by the pole pieces and in contact closing position. Shortly before the current zero passage, the resultant force $K_r$ becomes zero and immediately thereafter negative. Consequently, a repulsive force now acts on the switching element 1 so that the current I is interrupted immediately previous to the current zero passage. If during the locking interval a small current is maintained in parallel to the switching element through the impedance $Z_e$, the reclosing of the circuit occurs as soon as the resultant force $K_r$, corresponding to the reduced current, becomes again positive. For instance, if $Z_e$ is an accordingly dimensioned ohmic resistance, the reclosing of the circuit takes place when the voltage across the contact plates 4 and 5 becomes again positive. By providing the impedance $Z_e$ with a reactive (i. e. inductive or capacitive) component, the switching moment can be phase-displaced in either direction so that a voltage regulation free of losses is readily obtainable. The resultant force corresponding to the small current through the impedance $Z_e$ is represented in Fig. 2 by a broken line denoted by $K'_r$. The character and rating of impedance $Z_1$ and $Z_2$ as well as other design features of the apparatus will be referred to in a later place.

Fig. 3 shows a contact apparatus of the electrodynamic type. Two stationary coils are denoted by 20 and 21. A movable coil 22 is connected through an insulator 23 with a contact arm 24 revolvable about a pivot point 25. The contact arm is electrically engageable with a stationary contact 26 and biased toward contact opening position by a spring 27. The circuit to be controlled by the apparatus extends from point A through an impedance $Z_1$ to point B, and thence through coil 20 and coil 22 to arm 24, contact 26 and terminal point C. From point A, the current has also a component which flows through an impedance $Z_2$ and through coil 21 to point B. Consequently, in similarity to the embodiment of Fig. 1, the current entering at point A divides itself into two components $I_1$ and $I_2$, of which the component $I_2$ is effective in coil 21, while the total current I passes serially through coils 20 and 22. Since only the mutual inductance values of the three coils 20, 21 and 22 are variable, two component forces are effective on the armature, of which one is proportional to $I_2$ while the other is proportional to the product $I \cdot I_2$. By a proper selection of impedances $Z_1$ and $Z_2$, the resultant $K_r$ of the two component forces can again be caused to pass through zero ahead of the current I to be controlled by the apparatus.

The just-mentioned operation of the apparatus of Fig. 3 deals only with the automatic opening performance. If automatic closing is desired, the spring 27 may be controlled so that its force is periodically variable, for instance, so that the spring force provides contact pressure between armature 24 and contact 26 when the circuit is closed and passes through zero to assume the opposite direction when the interruption of the circuit is initiated. This can be obtained by means of a bias control device similar to the one shown in Fig. 4 and described below.

In the embodiment according to Fig. 4, a main coil traversed by the current I is denoted by 30 and an additional coil traversed by the component current $I_2$ is denoted by 31. The respective ampere turns cooperate to produce a resultant magnetic flux $\phi_r$. The magnetic yoke or field structure is denoted by 32 and the appertaining armature by 33. A movable contact 34 is mounted on the armature but electrically insulated therefrom. The appertaining stationary contact 35, insulatedly mounted on yoke 32, is electrically series-connected with coil 30. The biasing spring 36 is controlled to vary its force P in opposing directions. The control is effected by a control member 41 which is pivoted at 42 so as to be movable between the two positions shown by broken lines. Member 41 is linked at 43 to the spring 42. When contacts 34 and 35 are closed, member 41 is latched by a pawl 44. Then the spring 42 is under compression and forces contact 34 toward contact 35. In order to open the contactor, the pawl 44 is unlatched and member 41 is moved toward the right. This movement is relatively slow compared with the period of the alternating current and is effected either manually by operating the illustrated handle 45 or by means of a magnet or motor (not illustrated). During the movement of member 41, the spring 42 is gradually tensioned until the movable contact 34 is separated from the stationary contact. This separation occurs at a moment when the current and hence the attractive magnetic force is near a zero passage because the movement of member 41 is very slow as compared with the frequency of the current to be interrupted.

The circuit and magnetic elements of this apparatus are dimensioned in accordance with the invention so that the resultant magnetic flux $\phi_r$ leads the current I to the desired extent, the resultant force acting on the armature being essentially determined by the flux obtaining in the air gap. The degree of phase advance for flux $\phi_r$ is determined by the character and rating of the impedances $Z_1$ and $Z_2$ as well as by the number of turns of coils 30 and 31. A favorable operation is obtained, for instance, if $Z_1$ is essentially inductive and $Z_2$ is an essentially ohmic resistance as is shown in Fig. 4. With rapidly operating switches in which the movable contact traverses the entire path of switching motion within intervals of less than one millisecond, a phase advance of the flux in the amount of some electrical degrees can readily be obtained in this manner. It should be considered however, that the resultant ampere turns should preferably have a somewhat larger phase advance because the flux may to some extent lag these ampere turns due to inevitable energy losses.

Aside from the above-mentioned selection of the impedances $Z_1$ and $Z_2$, some other arrangements are possible. For some applications, instance, the impedance $Z_1$ may be essentially capacitive, or $Z_1$ may be designed in the form of a resistance and $Z_2$ may then be either capacitive or inductive. The phase-biasing circuit arrangement may also be designed as a phase-shifting bridge circuit or in any other manner known for phase-shifting purposes.

All illustrated embodiments have in common that the resultant force acting on the movable switching element is phase-advanced relative to the current to be switched. By virtue of this characteristic, a synchronous control of switches, relays, rectifiers and the like apparatus can readily be secured in such a manner that the interruption is initiated shortly before the current zero passage and that a sufficiently large contact-separating distance is reached at the current zero moment. However, the phase-advancing effect of apparatus according to the invention may also be used for a synchronous control of circuit closing operations, especially in mechanical rectifying equipment, so that, for instance, the closing moments occur in a predetermined phase relation to the voltage. It is an essential advantage that no additional relays or other accessory control devices are required for achieving such a timed performance; and this contributes to increased reliability and reduced cost as compared with synchronous switching and contact rectifier equipment heretofore available.

In general, apparatus according to the invention solve various problems incident to transient or switching phenomena of general type. Such phenomena, aside from the opening and closing of load circuits, include the transition from a two-phase short-circuit to a three-phase short-circuit in alternating-current systems, the occurrence of a single-phase short-circuit in systems with a grounded star point or grounded neutral conductor and the subsequent conversion of such single-phase grounding to two or three-phase short-circuits. Any such switching phenomena may cause a distortion of current and voltage characteristics and, as a rule, also a time displacement of the current zero passages and hence can more readily be coped with when applying apparatus according to the invention.

However, in order to safeguard a reliable operation under all expectable current conditions, apparatus according to the invention should be rated so that the contact-controlling force builds up to a sufficient value within an interval of at most two milliseconds, even for moderate requirements. For more exacting requirements, a much smaller time constant down to $10^{-4}$ seconds and less should be provided. This means, for instance, that when the apparatus serves for closing a circuit, i. e. when the current to be switched-in was zero and the resultant force for moving the switch contact to closed position was also zero, this resultant force builds up at such a rate that it leads the current after at most two milliseconds by about two-thirds of the full value. It may also be desirable to have the resultant force build up with a time constant, i. e. within an interval, smaller than the desired phase advance. For instance, in order to secure a desired leading angle of 3°, corresponding to $5.4 \times 10^{-4}$ seconds at 50 C. P. S. and relating to stable operating conditions, the force may have to build up with a time constant of only about $2 \times 10^{-4}$ seconds.

In order to adapt the apparatus to an extended current range, the phase-advance is preferably made dependent upon the effective value of the current to be controlled, especially in such a manner that the advance increases with reducing current values. It is thus made certain that the contact movement remains sufficiently large even when the forces and corresponding currents are small. Such an automatically varying phase-shift angle is obtained, for instance, by using impedances $Z_1$ and $Z_2$ whose impedance value varies to the desired extent as a function of the current amplitude. For instance, the provision of an impedance $Z_1$ composed of an air-cored choke coil 38 and a series-connected iron-cored choke coil 39, as shown in Fig. 4, may serve this purpose.

In describing above the illustrated embodiments, it was assumed that the magnetic flux is in phase with the current inducing the flux. As mentioned, this is not normally the case, and the existing lag of the flux is apt to cause disturbance of the switching performance especially when operating with switching intervals in the order of $10^{-4}$ seconds. However, the presence of the time lag does not obviate the fact that in the illustrated embodiments as far as they have been described, the flux and force occur earlier than they would otherwise, due to the phase-shift features of the controlling coil circuits. Hence, these embodiments permit eliminating or compensating for such phase lag and make it possible to introduce sufficient overcompensation to make a normally lagging force or flux leading as regards the current.

As mentioned, my invention also provides means that permit adjusting or selecting the time characteristic of the contact-controlling force by virtue of particular design features of the contactor structure as such. Such design features will be described presently. In general, they are of magnetic and mechanical nature rather than relating to the control or coil circuits proper and make the contact apparatus accurately respond to the predetermined critical value regardless of changes in the time characteristic of the magnetic flux as compared with the characteristic of the controlling current. The critical value intended to cause a response of the contact apparatus may be a predetermined instantaneous current value; or it may be a given time value relative to the current cycle period, for instance, a time point a given interval ahead of the current zero passages; or the critical value may be a given magnitude of voltage, power, or temperature; and the features of my invention now to be referred to are essentially such as to maintain an accurate response to whatever critical value is effective to initiate the switching action, regardless of the occurence of the above-explained phase lag and trapezoidal or other distortion of the flux.

There are three possibilities according to my invention of designing electromagnetic contactor structures for achieving the just-mentioned behavior. In the first place, the ferromagnetic structure of the apparatus may be composed of special materials which substantially eliminate the time lag of the magnetic flux relative to the current. Secondly, a premagnetization of the magnetic circuit may be applied to compensate for the time lag at least to the extent needed to forestall harmful effects on the switching performance. Thirdly, the biasing or return force, acting on the movable switch member or armature, may be controlled to compensate wholly or partly for the disturbing effects of the time lag on the switching performance. These three possibilities, afforded by the invention, will now be described in detail, also with reference to the embodiments shown in Figs. 1, 3 and 4.

The disturbing time lag of the magnetic flux, relative to the current that induces the flux, is essentially determined by the losses occurring in the apparatus structure. Most significant in this respect are magnetic hysteresis losses. Eddy-current losses and losses due to after-effects also contribute, and the copper losses in the magnetizing coils may also have some effects. Therefore, the magnetic circuits of contact apparatus according to the invention are preferably composed of material of very small total losses, amounting, for instance, to at most 1 w./kg. at an induction of 10,000 gauss and a frequency of 50 C. P. S. However, since in many cases the flux lag is mainly determined by hysteresis losses, it is advantageous to use material whose hysteresis losses, for instance at 10,000 gauss and 50 C. P. S. remain below 1 w./kg. The flux lag can also be reduced by using for the magnetic circuit materials of an effective permeability below 1,000.

It is generally preferable to secure a magnetic flux of approximately the same, for instance sinusoidal, wave shape as that of the current. This is achieved by dimensioning the entire magnetic circuit so that the magnetizing effects are limited to the unsaturated and substantially linear portion below the knee of its resultant magnetic characteristic. In many cases, it suffices to provide a flux characteristic whose relative steepness at the flux zero passage is at most twice as large as the relative steepness of the flux-producing current at the current zero passage. Relative steepness, as here referred to, is defined as the absolute value of steepness $$\frac{d\phi}{dt} \text{ or } \frac{dI}{dt}$$

at the zero value, divided by the maximum value ($d\phi_{max.}$ or $dI_{max.}$). For instance, the relative steepness of the flux $\phi$ equals $$\frac{d\phi : dt}{d\phi_{max}}$$

In cases where it is essential to reduce the flux lag to a minimum and to obtain a flux curve as closely similar as possible to the current curve, comminuted material such as powdered iron may be used for the magnetic circuit elements, i. e. a material of relatively low and rather constant permeability which has also minimum losses.

The above-mentioned design and selection of material for the magnetic circuit can, for instance, be applied to the parts 2, 3 and 8 of a contactor structure as shown in Fig. 1 or to the parts 32 and 36 of a contactor as shown in Fig. 4. As a result, the contactors will be inherently free of a substantial flux lag so that an appreciable improvement is attained even if these contactors are equipped with ordinary coil circuits instead of those illustrated. However, best results are obtained if the described magnetic design is used in combination with phase-biasing coil circuits. Then, the coil circuits need be rated only for securing the additional phase-advance of the flux required to give it the desired leading angle relative to the current.

The above-mentioned possibility of compensating the flux lag by premagnetization is likewise applicable instead of, or in combination with, the other features of my invention. The premagnetization may be effected by constant or variable magnetic flux, for instance, by means of an auxiliary coil indirectly associated with the magnetic circuit as is exemplified in Fig. 4 by coil 40. A similar coil may also be placed on core 8 in Fig. 1. As a rule, the premagnetization is to be kept at a low value so that it alone is incapable of causing movement of the armature. In many cases of application, the magnitude of premagnetization can advantageously be made dependent upon the current for controlling the armature, for instance, by connecting the coil 40 with the contactor control circuit.

The above-mentioned third possibility of designing the contactor structure proper for a reduced effect of the flux lag involves the provision of means that produce or control a variable or return biasing force which acts on the armature in the sense needed to compensate the retarding effect of the flux lag. Biasing means of this kind are described above with reference to Figs. 3 and 4. For instance, if the conditions are such that at the moment of current zero passage the flux is not zero but has still a finite value $\phi_0$ and hence still exerts a corresponding armature holding force $K_0$, and if the interruption is nevertheless supposed to begin before the current zero passage, then the biasing force, acting in the contact opening sense, must be larger than $K_0$. This, however, has the disadvantage that a correspondingly larger switching-in flux must be provided in order to close the contact against the increased opposing bias force. Hence, in such cases, the armature biasing means are to be controlled in such a manner that, when closing the contact, the biasing force is smaller than at the contact opening moment. To this end the biasing member, such as the return spring of the movable switching member, may be controlled by an electromagnetic device so that the return bias is larger at increasing flux than at decreasing flux. Such a bias control is not only applicable to contactors and switches in the ordinary sense but is also of advantage for commutating rectifying devices.

An armature bias control may be employed without the other features of the invention or, preferably, in combination therewith. For instance, the flux lag may be minimized by the above-described selection of material and design of the magnetic circuit or contactor structure, and any residual lag may then be compensated by armature bias control or by a combined premagnetization and bias control; and any of these means may be applied in conjunction with the above-described phase-biasing coil circuits to achieve most favorable results.

In view of the foregoing explanations and the various modifications above referred to, it will be obvious to those skilled in the art, after a study of this disclosure, that the invention can be embodied in apparatus other than those specifically illustrated and described, without departing from the objects and characteristics of my invention and within the essential features set forth in the claims annexed hereto.

I claim as my invention:

1. Electric switching apparatus for variable current, comprising a movable switching member to be controlled by resultant force, electromagnetic means magnetically coupled with said member and having two control coils for providing respective components of said force, a variable-current circuit extending serially through said coils, and phase-shift impedance means connected across one of said coils so as to phase-displace the current flowing through said one coil relative to the current flowing through said other coil in order to phase-advance said resultant force relative to said component caused by said other coil.

2. Electric switching apparatus for variable current, comprising a movable switching member to be controlled by resultant force, electromagnetic means magnetically coupled with said member and having two control coils for providing respective components of said force, an electric variable-current circuit extending serially through said coils, an essentially reactive impedance means and an essentially ohmic impedance means connected in series with each other across one of said coils so that said other coil is traversed by the total current of said circuit while said one coil is traversed by component current phase-advanced relative to said total current.

3. Electric control apparatus for variable current, comprising a magnetic circuit including a movable armature and a yoke structure, magnetizing means disposed for controlling said armature and having two control coils and additional field-producing means inductively associated with said magnetic circuit, a variable-current circuit connected with one of said coils for energizing the latter to provide together with said field means a first component force, phase-shift impedance means connected with said other coil and with said circuit for energizing said other coil to provide together with said field means a second component force phase-displaced relative to said first component force, whereby said armature is subjected to a resultant control force phase-advanced relative to the variable current of said circuit.

4. Electric control apparatus for variable current, comprising a magnetic circuit including a movable armature and a yoke structure, magnetizing means disposed for controlling said armature and having two control coils and a permanent magnet inductively associated with said magnetic circuit to provide two variable and one constant component magnetic fluxes respectively, a variable-current circuit connected with one of said coils for energizing the latter to provide together with said constant flux a first component force, phase-shift impedance means connected with said other coil and with said circuit for energizing said other coil to provide together with said constant flux a second component force phase-displaced relative to said first component force, whereby said armature is subjected to a resultant control force phase-advanced relative to the variable current of said circuit.

5. Electric control apparatus for variable currents comprising a magnetizable field structure having two pole pieces, an armature movably disposed between said pole pieces and comprising a permanent magnet, two control coils disposed on said structure, a variable-current circuit connected with said two coils for providing excitation therefor, and phase-biasing means connected across one of said coils to advance the excitation of said one coil relative to that of the other in order to phase-advance the force acting on said armature when said coils are excited.

6. Electric contact apparatus for variable currents, comprising contact means having a movable switching member to be controlled by resultant force, an electric variable-current circuit extending through said contact means so as to be controlled by said member, two control coils operatively coupled with said member for providing respective components of said resultant force and series connected in said circuit to be energized in dependence upon the current in said circuit, and current-responsive phase-biasing means connected across only one of said coils for variably phase-shifting one of said component forces relative to the other so that said resultant force leads said current by a phase angle increasing at decreasing effective values of said current.

7. Electric contact apparatus according to claim 6, wherein said phase-biasing means comprise an air-cored reactor and an iron-cored reactor series-connected with each other.

8. Electric contact apparatus for alternating current, comprising a polarized magnetic circuit including a movable armature and electric contacts controlled by said armature, an alternating-current circuit extending through said contacts to be controlled thereby, control coil means connected with said circuit so as to cause movement of said armature to open said contacts when the current in said circuit is of sufficient magnitude and of suitable polarity, and an impedance means connected across said contacts and dimensioned to maintain a given finite magnetization of said magnetic circuit when said contacts are open.

9. An alternating-current contactor, comprising an alternating-current circuit, contact means for controlling said circuit having a member movable between circuit opening and closing positions and biased toward one of said positions, a movable coil mounted on said member, two stationary coils disposed in mutually inductive relation to said movable coil and electrically series-connected therewith in said circuit, and phase-biasing impedance means electrically connected across one of said coils so as to phase-advance the component force due to mutual inductivity between said movable coil and one of said stationary coils relative to the component force due to mutual inductance between said movable coil and said other stationary coil, whereby said coils impose on said member a resultant force toward said other position and phase-advanced relative to the current in said circuit.

10. An alternating-current contactor, comprising a magnetic circuit having a field structure and an armature, said armature having electric contact means and being movable relative to said structure between two positions and biased toward one of said positions, an alternating-current circuit extending through said contact means to be controlled by said armature, coil means inductively associated with said structure and connected to said circuit for controlling said armature to move to said other position in an interval of given phase relation to the cycle period of the alternating current in said circuit, and a premagnetizing coil disposed on said structure for phase-biasing said interval and having a coil circuit rated for providing in said structure a flux magnitude below that required for moving said armature against its bias.

11. An alternating-current contactor, comprising a field structure, an armature movable relative to said structure between two positions, biasing means connected with said armature and tending to hold it in one of said positions, an alternating-current circuit controlled by said armature, coil means inductively associated with said structure and electrically connected to said circuit for controlling said armature to move to said other position, and electric control means in controlling connection with said biasing means and electrically connected with said circuit to vary the force of said biasing means in a given phase relation to said current.

12. An alternating-current contactor comprising a magnetic circuit including a movable armature, said armature having contact means, an alternating-current circuit extending through said contact means to be controlled by movement of said armature, coil means connected with said circuit and inductively associated with said magnetic circuit to induce in said magnetic circuit an armature-moving flux, phase shift means connected with said coil means to retard said flux relative to the current in said alternating-current circuit, biasing means connected with said armature for imposing thereon a biasing force in opposition to the moving effect of said flux, and control means electrically connected to said alternating-current circuit and in controlling connection with said biasing means for controlling said force to be smaller when said flux increases than with decreasing flux.

13. An electromagnetic contactor for alternating current, comprising a magnetic circuit having an armature movable between two positions within switching intervals in the order of $10^{-4}$ seconds and biased toward one of said positions, said magnetic circuit being essentially composed of ferromagnetic material whose hysteresis losses at 10,000 gauss and 50 C. P. S. are smaller than 1 w./kg., an alternating-current circuit controlled by said armature, and coil means inductively associated with said magnetic circuit for moving said armature to said other position and connected to said alternating-current circuit to be energized in dependence upon the current of said latter circuit.

14. An electromagnetic contactor for alternating current, comprising a magnetic circuit having an armature movable between two positions within switching intervals in the order of $10^{-4}$ seconds and biased toward one of said positions, said magnetic circuit being essentially composed of ferromagnetic material of an effective permeability below 1,000 whose losses at 10,000 gauss and 50 C. P. S. are at most about 1 w./kg., an alternating-current circuit controlled by said armature, and coil means inductively associated with said magnetic circuit for magnetically moving said armature to said other position and connected to said alternating-current circuit to be energized in dependence upon the current of said latter circuit.

15. An electromagnetic contactor for alternating current, comprising a magnetic circuit having an armature movable between two positions within switching intervals in the order of $10^{-4}$ seconds and biased toward one of said positions, an alternating-current circuit controlled by said armature, coil means inductively associated with said magnetic circuit to provide it with magnetization for moving said armature to said other position, said coil means being connected in said alternating-current circuit to be energized by the current of said latter circuit, and said magnetic circuit being dimensioned relative to said coil so that said magnetization remains within the linear unsaturated portion below the saturation knee of the magnetic characteristic of said magnetic circuit.

16. An alternating-current contactor, comprising a magnetic circuit having an armature for switching performance within intervals shorter than a millisecond, two coil means inductively associated with said magnetic circuit for inducing therein a magnetic flux to control said armature, an alternating-current circuit controlled by said armature and connected to said coil means for energizing the latter, said magnetic circuit consisting essentially of material having a total loss below 1 w./kg. at 10,000 gauss and 50 C. P. S. for causing said flux to have negligible phase lag relative to the energization of said coil means, and phase-biasing impedance means connected across one of said coil means for causing said energization to phase-lead the current flowing in said alternating-current circuit in order to cause said flux to also lead said current.

17. Electric switching apparatus, comprising a movable switching member to be controlled by resultant force, two control circuits electromagnetically associated with said member for imposing on said member two respective components of said force, alternating-current supply means, said two circuits being connected to said supply means to receive energization therefrom, and phase-shift impedance means disposed in one of said circuits to displace the phase of its energization relative to that of said other circuit for phase-advancing said resultant force relative to the current of said supply means.

18. Electric switching apparatus, comprising a movable switching member to be controlled by resultant force, a magnetic circuit including said member, two control coils inductively associated with said magnetic circuit for providing respective components of said force, variable-current supply means, said two coils having respective coil circuits connected to said supply means to receive energization therefrom, and phase-shift impedance means disposed in one of said circuits to displace the phase of the energization in one coil relative to that of the other coil for phase-advancing said resultant force relative to the current of said supply means.

19. An electromagnetic contactor for alternating current, comprising a magnetic circuit having an armature movable between two positions within switching intervals in the order of $10^{-4}$ seconds and biased toward one of said positions, an alternating-current coil circuit inductively associated with said magnetic circuit for moving said armature to said other position, said magnetic circuit being essentially composed of ferromagnetic material whose total losses at 10,000 gauss and 50 C. P. S. are at most 1 w./kg.

20. An electromagnetic control apparatus for alternating current, comprising terminals for supplying alternating current, contact means connected between said terminals for controlling said current, a magnetic circuit essentially composed of ferromagnetic non-retentive material having less than 1 w./kg. total losses at 10,000 gauss and 50 C. P. S., said magnetic circuit having an armature mechanically connected with said contact means for controlling said contact means, said armature being movable between two positions within a switching interval in the order of $10^{-4}$ seconds and biased toward one of said positions, energizing coil means inductively associated with said magnetic circuit to induce flux therein for moving said armature to said other position, said magnetic circuit, coil means and current being rated relative to one another so that said flux at its zero passages has a steepness at most twice as large as that of said current at the current zero passages.

FRITZ KESSELRING.

REFERENCES CITED

The following references are of record in the file of this patent:

UNITED STATES PATENTS

| Number | Name | Date |
|---|---|---|
| 1,019,608 | Dempster | Mar. 5, 1912 |
| 1,184,233 | Giglio | May 23, 1916 |
| 1,221,981 | Edison | Apr. 10, 1917 |
| 1,307,517 | Rainey | June 24, 1919 |
| 1,446,757 | Luscomb | Feb. 27, 1923 |
| 2,169,732 | Legg | Aug. 15, 1939 |
| 2,224,934 | Schuhmacher | Dec. 17, 1940 |
| 2,230,228 | Bandur | Feb. 4, 1941 |

FOREIGN PATENTS

| Number | Country | Date |
|---|---|---|
| 548,243 | France | Jan. 10, 1923 |